3,023,147
METHOD FOR THE PREPARATION OF 16-ACETYL-DIGITALINUM-VERUM
Kazuo Miyatake, Atsuji Okano, Kazuhiko Hoji, Tosaku Miki, Akio Sakashita, Tokyo, and Yasuo Oshima, Kunitachi-machi, Kitatama-gun, Tokyo-to, and Akira Kasahara, Ichikawa, Japan, assignors to Daiichi Seiyaku Co., Ltd., Tokyo, Japan, a Japanese corporation
Filed Oct. 5, 1959, Ser. No. 844,424
Claims priority, application Japan Oct. 11, 1958
3 Claims. (Cl. 195—30)

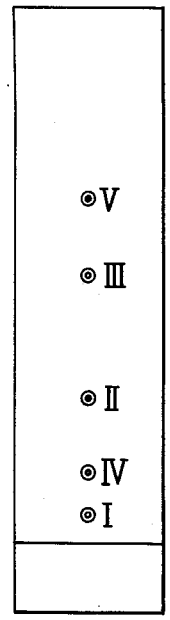
I. DIGITALINUM-VERUM
II. DIGITALINUM-VERUM-MONOACETATE
III. DIGITALINUM-VERUM-DIACETATE
IV. 16-ACETYL-DIGITALINUM-VERUM
V. STROSPESIDE 3,023,147
Patented Feb. 27, 1962

The present invention relates to a method for the preparation of new 16-acetyl-digitalinum-verum, and to the said new digitalinum-verum obtained thereby.

An object of the present invention is to obtain new 16-acetyl-digitalinum-verum, which exhibits much stronger cardiac action than the original glycoside, namely, digitalinum-verum.

Another object of this invention is to obtain new glycoside which is very advantageous in view of the practical technique to prepare an injection.

Other objects, features and advantages of the present invention will be apparent from the following detailed description.

This invention relates to a method for preparing new 16-acetyl-digitalinum-verum, in which digitalinum-verum-hexaacetate, a cardiotonic glycoside in the gitoxigenin series, is saponified partially with sodium or potassium bicarbonate and then treated with esterase, thereby a new cardiotonic glycoside, 16-acetyl-digitalinum-verum, is obtained which contains acetyl radical at the 16-position of the gitoxigenin moiety of its molecule and exhibits stronger cardiac action in comparison with the original glycoside, digitalinum-verum.

The inventors have executed numerous experiments and laborious studies for a long time, and came to an idea that in order to utilize digitalinum-verum rich in *Digitalis purpurea* as cardiotonics, it is necessary to strengthen its cardiac action by acetylating only the hydroxyl group of the 16-position. With the ordinary acetylating method, however, not only the hydroxyl group at the 16-position but also hydroxyl group of the sugar moiety of the molecule are acetylated, and when the acetyl derivative thus obtained is treated under the ordinary saponifying condition only one hydroxyl group in the digitalose moiety of the molecule remains acetylated. The product thus obtained has been referred to as a digitalinum-verum monoacetate, in literatures (cf. structural Formula II as disclosed later). Cardiac action of this compound is weaker than that of the original glycoside, digitalinum-verum. The inventors, however, succeeded in preparing 16-acetyl-digitalinum-verum, by altering the saponifying condition and then by using esterase, and discovered that this compound possesses very strong cardiac action as expected.

With regard to 16-acetyl-digitalinum-verum, R. Tschesche had already reported in Chemische Berichte, vol. 85, page 1105 (1952), that this substance existed in leaves of *Digitalis latana* together with gitorin and that both were very difficult to be separated from each other. Afterwards, however, in Chemische Berichte, vol. 88, page 1573 (1955), the same author revoked its existence, pointing out the error of the above-mentioned report. Such being the case, the authenticity of 16-acetyl-digitalinum-verum in K. B. Jensen's report which appeared in the Journal of Pharmacy and Pharmacology, vol. 7, page 334 (1955), must be denied as a matter of course, since the author stated that he obtained the sample from R. Tschesche by transfer. So, it becomes clear that 16-acetyl-digitalinum-verum is a new substance which was prepared for the first time by the inventors of this application. This new substance, 16-acetyl-digitalinum-verum, can be illustrated by the structural Formula IV in the following general formula.

The new digitalinum-verum may be represented by the following general formula:

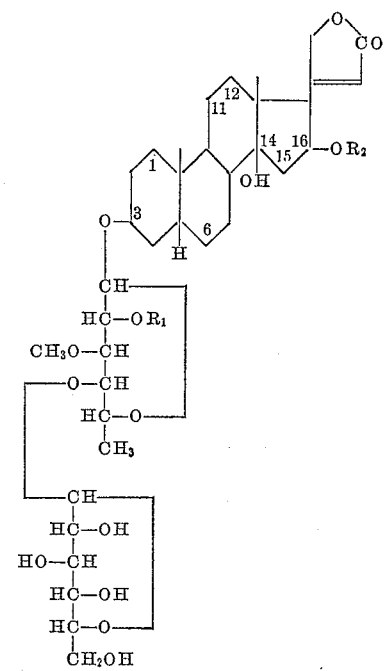

wherein $R_1$ and $R_2$ represent respectively a hydrogen atom or a acetyl group.

(1) Digitalinum-verum ($R_1=R_2=H$)　　　(I)

(2) Digitalinum-verum-monoacetate
　　　　　　　　($R_1=CH_3CO-$, $R_2=H$)　(II)

(3) Digitalinum-verum-diacetate
　　　　　　　　($R_1=R_2=CH_3CO-$)　(III)

(4) 16-acetyl-digitalinum-verum
　　　　　　　　($R_1=H$, $R_2=CH_3CO-$)　(IV)

This product shown by the Formula IV is that of the present invention.

Acetylation of digitalinum-verum (structural Formula I) as described above may be carried out by one of known methods, wherein the digitalinum-verum is dissolved in tertiary amine, such as pyridine, pycoline, quinoline, trimethylamine or dimethylformamide, and then is treated with acetic acid anhydride or acetyl halide, or by other acetylating method, wherein the aforesaid substance is reacted with acetic acid anhydride in glacial acetic acid.

The completely acetylated compound, digitalinum-verum-hexaacetate thus obtained is easily crystallized, and has characteristic double melting points, 182–186°/228–231° C. Preparation of digitalinum-verum-diacetate from the hexaacetate may be carried out as described in the specific example appearing hereinafter.

The completion of the reaction can be determined by subjecting a part of the reaction solution to paper chromatography as shown below and by examining the progress of the reaction if the reaction is not stopped at an appropriate time, the acetyl group at the 16-position may also be deacetylated to obtain digitalinum-verum-monoacetate (structural Formula II as shown later, and so it is impossible to obtain the desired product, 16-acetyl-digitalinum-verum (structural Formula III). Consequently, it is required to effect the test by paper chromatography at definite intervals of time and determine the reaction time. Since when the reaction temperature is higher or when the quantity of potassium bicarbonate or sodium bicarbonate is greater, the deacylation of the 16-position will also take place, special attention should be called to these facts.

The filter paper is previously impregnated with water-acetone mixture (1:4), and water saturated-methylethylketone-methylisobutylketone (mixing rate 1:1) is used as the developing solvent. Glycosides are detected on paper by spraying with 20% antimony chloride-chloroform solution. The state of the above deacetylation is traced as definite intervals of time by this paper chromatograph. Thus, it is regarded as the best condition that paper-chromatographic analysis of the reaction mixture shows the presence of a major component with Rf (0.66) which is smaller than that of strospeside (Rf 0.73) and larger than that of digitalinum-verum monoacetate (Rf 0.43). When the reaction mixture is purified by partition chromatography with Celite 535 as a carrier and with water-saturated methylisobutylketone as the developing solvent, the main product, digitalinum-verum diacetate (structural Formula III) is obtained. This diacetyl compound is recrystallized from water-saturated methylisobutylketone to form needle crystals, M.P. 181–184° C., $[\alpha]_D^{26}$ —24.0 (in methanol). The ultraviolet absorption spectrum of this compound shows a maximum at 217 m$\mu$ in ethanol (log e 4.18), but it moves to 270 m$\mu$, the numerical value of which is characteristic of 16-anhydro-gitoxigenin, when this compound is treated by alumina adsorption chromatography. This fact indicates that deacetylation reaction takes place with alumina, and 16-anhydro-gitoxigenin is obtained, and that one of the acetyl groups of the diacetyl compound is located in digitalose moiety and the other at the 16-position of its molecule. The values of elementary analysis and quantitative analysis of acetyl groups agree well with the theoretical value of the diacetate.

The diacetyl compound or the reaction mixture containing the said compound obtained by the above-mentioned saponification is then treated with esterase, such as an enzyme obtained from snail, and the product thus treated is purified by partition chromatography with Celite 535 as a carrier and with water-saturated methylethylketone or a mixing solution of methylethylketone-methylisobutylketone (mixing ratio 1:1) saturated with water as the developing solvent. Thus, only one acetyl group in digitalose moiety is selectively deacetylated to produce the desired 16-acetyl-digitalinum-verum (structural Formula IV).

In order to enable the invention to be more readily understood, reference is made to the accompanying drawing which shows diagrammatically various digitalinum compounds separated by paper chromatography.

By the said paper chromatography, 16-acetyldigitalinum-verum (structural Formula IV), digitalinum-verum-monoacetate having one acetyl group in digitalose moiety (structural Formula II), digitalinum-verum (structural Formula I), digitalinum-verum-diacetate (structural Formula III) and stropeside (gitoxigenin-D-digitaloside) are distinctly separated as shown in the drawing. The detailed method of this paper chromatography is as follows.

Developing solvent: Methylethylketone-methylisobutylketone (1:1) saturated with water.
Filter paper: Toyo filter paper, No. 50 (filter paper made for the purpose of paper chromatography).
Impregnating method: The filter paper is immersed in acetone-water (4:1) for 5 minutes and then the excess liquid is removed by pressing the filter paper between two sheets of large dried filter papers.
Developing method: Ascending method for 3 to 4 hours.
Coloring method: 20% antimony trichloride-chloroform solution is sprayed over the said filter paper and the paper is then heated at 80° C. for 3 minutes, whereby bluish-white fluorescence is observed under ultraviolet-ray.

| | |
|---|---|
| Digitalinum verum | (I) |
| Digitalinum-verum-monoacetate | (II) |
| Digitalinum-verum-diacetate | (III) |
| 16-acetyl-digitalinum-verum | (IV) |
| Strospeside | (V) |

16-acetyl-digitalinum-verum is colorless powder; easily soluble in water, methanol, ethanol, acetone and ethyl acetate; soluble in chloroform and substantially insoluble in benzene and ether. Its ultraviolet absorption spectrum has a maximum absorption at 217 m$\mu$ (log $\epsilon$ 4.16), and the values of elementary analysis and quantitative analysis of acetyl group agree well with the theoretical value; $[\alpha]_D^{26}$ —21.1° (in methanol).

This compound is deacetylated with alumina, and converted to 16-anhydro-digitalinum-verum which has its maximum absorption at 270 m$\mu$.

In the case of the known glycosides which contain 16-acetyl-gitoxigenin (oleandrigenine) as aglycon in the molecules, for example, oleandrine, hongheloside A and cryptograndoside A, acetyl group at the 16-position exerts greatly an influence upon their molecular rotation ($[M]_D$) and the difference of molecular rotation ($\Delta[M]_D$) between 16-acetyl compounds and their corresponding deacetylated compounds are shown from the following table; the values of the last four compounds in the table were measured by the inventors and those of the others were derived from literatures.

| | $[\alpha]_D$ | $[M]_D$ | $\Delta[M]_D$ |
|---|---|---|---|
| Gitoxigenin | +32.6 | +127 | 169 |
| Oleandrigenin | —9.8 | —42 | |
| 16-desacteyl-oleandrin | —24.9 | —133 | 167 |
| Oleandrin | —52.1 | —300 | |
| 16-desacetyl-hongheloside A | +13.6 | +73 | 154 |
| Hongheloside A | —14.0 | —81 | |
| 16-desacetyl-cryptograndoyside A | —3.4 | —18 | 172 |
| Cryptograndoside A | —32.9 | —190 | |
| Digitalinum-verum-monoacetate | —2.9 | —22 | 169 |
| Digitalinum-verum-diacetate | —24.0 | —191 | |
| Digitalinum-verum | +1.6 | +11 | 170 |
| 16-acetyl-digitalinum-verum | —21.1 | —159 | |

It is obvious from the above table that in the case of 16-acetyl-digitalinum-verum the same variation of the rotation can be observed.

With regard to the physiological action of digitalinum-verum and its acetylated derivatives, the lethal dose of this compound by pigeon is represented below in comparison with the lethal dose of other compounds of digitalinum-verum series.

| | Mg./kg. |
|---|---|
| Digitalinum-verum | 2.432 |
| 16-acetyl-digitalinum-verum | 0.5008 |
| Digitalinum-verum-monoacetate | 12.82 |
| Digitalinum-verum-diacetate | 2.021 |

As shown in the above table, the action of 16-acetyl compounds is stronger by about 5 to 6 times than that of the corresponding glycosides which are not acetylated at the 16-position. Furthermore, 16-acetyl-digitalinum-verum is easily soluble in water and physiological saline solution, having great advantage in the light of the practical preparation of an injection.

In short, this invention is intended to produce new 16-acetyl-digitalinum-verum, which is prepared by partial acetylation of digitalinum-verum and exhibits much stronger cardiac action than the original glycoside. The object of this invention is to strengthen cardiac action of digitalinum-verum which is relatively weak in physiological action and to afford it to be utilized clinically as cardiacs, and further the significance of this invention lies in offering the fact that it is very interesting in point of view of both practice and investigation.

The following example illustrates the way in which the method in this invention may be carried out in practice.

Example 8.5 grams of crude crystals of digitalinum-verum was dissolved in 130 cc. of pyridine, and to this solution was added 85 cc. of acetic acid anhydride. After standing at room temperature for 3 days, the reaction product was concentrated at 40° C. under reduced pressure. The residue thus obtained was then dissolved in 400 cc. of chloroform, and the chloroform solution was washed with a small quantity of water, 10% hydrochloric acid, water, dilute alkaline solution and water, successively. After drying with sodium sulfate, the solvent was distilled off and the residue was recrystallized from a mixed solution of acetone and ether; 11 grams of digitalinum-verum-hexaacetate was obtained as needles, M.P. 169–175°/222–227° C. 10 grams of this hexaacetate was dissolved in 1800 cc. of methanol, and this solution was added with 1.2 grams of potassium bicarbonate dissolved in 200 cc. of water. After standing at room temperature for 3 days, 200 cc. of water was added to this solution, and the total solution was neutralized with N-hydrochloric acid, and concentrated to about 400 cc. at 50° C. of water-bath temperature under reduced pressure. This concentrate was extracted 4 to 5 times with 400 cc. of chloroform-alcohol mixture (2:1), and the chloroform layer was washed with a small quantity of water and then concentrated to dryness at 50° C. of water-bath temperature under reduced pressure. 8 grams of the concentrate thus obtained was submitted to partition chromatography with 400 grams of Celite 535 as a carrier and with water-saturated methylisobutylketone as the developing solvent. The effluent was collected in 300 cc. fractions. The fraction Nos. 5 to 10 were collected together, the solvent was distilled off, and 3.4 grams of the residue was recrystallized from water-saturated methylisobutylketone; 3.1 grams of digitalinum-verum-diacetate was obtained as needles, M.P. 181–184° C. The crystal combines one molecule of crystal-water and its elementary analysis indicated that this compound was formulated precisely as $C_{40}H_{60}O_{16} \cdot H_2O$, that is as $C_{40}H_{62}O_{17}$, Calculated: C, 58.95%; H, 7.67%; $COCH_3$, 10.57%. Found: C, 59.20%; H, 7.31%; $COCH_3$, 10.19%.

To a solution of 2.47 grams of the above-mentioned diacetate in 2500 cc. of water was added the supernatant fluid of the water suspension obtained by twice treatment of 650 mg. of the powder containing enzyme prepared from the intestinal tract of the snail *Euhadra quaesita* Deshayes with 100 cc. of water, and 50 cc. of toluene added to the mixture. After standing in an incubator at 32° C. for 111 hours, the mixed solution was concentrated to 20 cc. at below 50° C. under reduced pressure. To the concentrate was added 300 cc. of alcohol, and the resulted precipitate (enzyme) was filtered off using the filtration-supporting agent such as Celite. After concentrating the filtrate under reduced pressure, 2.4 grams of the residue was submitted to partition chromatography with 300 grams of Celite 535 as a carrier and with water-saturated methylisobutylketone as the developing solvent, the effluent was collected in 100 cc. fractions. It was certified by paper chromatography that 16-acetyl-digitalinum-verum was accumulated in the fraction Nos. 8 to 11 (see drawing). From these fractions 1.4 grams of 16-acetyl-digitalinum-verum was obtained, which was 16.2% of the theoretical amount when calculated from the hexaacetate, and the yield can be further raised by improvement of the reaction conditions, and it is very advantageous that all by-products can be recovered. The result of elementary analysis of this product finely agrees with the theoretical amount.

As $C_{38}H_{58}O_{15}$, calculated: C, 60.46%; H, 7.73%; $COCH_3$, 5.70%. Found: C, 60.38%; H, 7.96%; $COCH_3$, 5.40%

What we claim is:

1. A method for the production of 16-acetyl-digitalinum-verum, which comprises partially deacetylating digitalinum-verum-hexaacetate with alkali bicarbonate to produce digitalinum-verum-diacetate, and then deacetylating only the digitalose moiety of the said digitalinum-verum-diacetate with esterase consisting essentially of enzyme from the intestinal tract of the snail *Euhadra quaesita* Deshayes.

2. A method as claimed in claim 1, in which the alkali bicarbonate is sodium bicarbonate.

3. A method as claimed in claim 1, in which the alkali bicarbonate is potassium bicarbonate.

References Cited in the file of this patent

Helvetica Chimica Acta, vol. 33 (1950), article by Aebi et al., pp. 1013 to 1034.